US012571239B2

(12) United States Patent
Krejčí et al.

(10) Patent No.: US 12,571,239 B2
(45) Date of Patent: Mar. 10, 2026

(54) CLOSING DEVICE FOR A MOTOR VEHICLE LOCK

(71) Applicant: KIEKERT AKTIENGESELLSCHAFT, Heiligenhaus (DE)

(72) Inventors: Martin Krejčí, Zlunice (CZ); Martin Vörös, Pardubice (CZ)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 72 days.

(21) Appl. No.: 18/292,411

(22) PCT Filed: Jul. 20, 2022

(86) PCT No.: PCT/DE2022/100529

§ 371 (c)(1),
(2) Date: Jan. 26, 2024

(87) PCT Pub. No.: WO2023/016600

PCT Pub. Date: Feb. 16, 2023

(65) Prior Publication Data

US 2025/0084674 A1 Mar. 13, 2025

(30) Foreign Application Priority Data

Aug. 11, 2021 (DE) ..................... 10 2021 120 893.9

(51) Int. Cl.

*E05B 81/20* (2014.01)
*E05B 81/06* (2014.01)

(Continued)

(52) U.S. Cl.

CPC .............. *E05B 81/20* (2013.01); *E05B 81/06* (2013.01); *E05B 81/36* (2013.01); *E05B 81/90* (2013.01); *E05B 83/18* (2013.01); *E05B 83/26* (2013.01)

(58) Field of Classification Search

CPC .......... E05B 81/20; E05B 81/06; E05B 81/36; E05B 81/90; E05B 83/18; E05B 83/26

(Continued)

(56) References Cited

U.S. PATENT DOCUMENTS 6,076,868 A * 6/2000 Roger, Jr. ............... E05B 81/14 292/216
2003/0038484 A1* 2/2003 Schwaiger ............. E05B 81/14 292/201

(Continued)

FOREIGN PATENT DOCUMENTS

DE 19828040 A1 * 12/1999 ............. E05B 81/14
DE 19933371 A1 * 2/2000 ............. E05B 81/20

(Continued)

OTHER PUBLICATIONS

International Search Report mailed Oct. 13, 2022, for priority International Application No. PCT/DE2022/100529.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A closing device for a motor vehicle lock, in particular to a closing aid for a motor vehicle door lock. According to its basic design, said closing aid has a locking mechanism substantially consisting of a rotary latch and a pawl. Furthermore, an electric motor and a transmission downstream of the electric motor are implemented. The transmission operates preferably on the rotary latch at least during a closing operation. According to the invention, a handle is (Continued)

provided, which is mounted at a lock housing for mechanically interrupting the closing operation, said handle impinging a force flux element, which can be selectively engaged and disengaged, as a component of the transmission.

11 Claims, 4 Drawing Sheets

(51) Int. Cl.

| | |
|---|---|
| ***E05B 81/36*** | (2014.01) |
| ***E05B 81/90*** | (2014.01) |
| ***E05B 83/18*** | (2014.01) |
| ***E05B 83/26*** | (2014.01) |

(58) Field of Classification Search
USPC .............................................................. 70/275
See application file for complete search history.

(56) References Cited

U.S. PATENT DOCUMENTS

| | | | | |
|---|---|---|---|---|
| 2004/0239124 | A1* | 12/2004 | Larsen | E05B 81/14 292/201 |
| 2005/0156436 | A1* | 7/2005 | Ju | E05B 81/14 292/216 |
| 2016/0312499 | A1* | 10/2016 | Fannon | E05B 81/06 |
| 2018/0087298 | A1* | 3/2018 | Strole | B62D 33/037 |
| 2018/0347240 | A1* | 12/2018 | Jeong | E05B 85/24 |
| 2024/0003169 | A1* | 1/2024 | Zejda | E05B 81/34 |

FOREIGN PATENT DOCUMENTS

| | | | | |
|---|---|---|---|---|
| DE | 102018124841 | A1 | 4/2020 | |
| DE | 102019110253 | A1 * | 10/2020 | B60J 5/047 |
| DE | 102019107845 | A1 | 11/2020 | |
| EP | 1657384 | A1 | 5/2006 | |
| WO | WO-2017029543 | A1 * | 2/2017 | B60N 2/01583 |

* cited by examiner

CLOSING DEVICE FOR A MOTOR VEHICLE LOCK

This application is a national phase of International Patent Application No. PCT/DE2022/100529 filed Jul. 20, 2022, which claims priority to German Patent Application No. 10 2021 120 893.9 filed Aug. 11, 2021, each of which is hereby incorporated herein by reference in its entirety.

FIELD OF DISCLOSURE

The invention relates to a closing device for a motor vehicle lock, in particular a motor vehicle door lock closing aid, with a locking mechanism consisting substantially of a rotary latch and a pawl, further with an electric motor, and a transmission following the electric motor, wherein the transmission preferably operates on the rotary latch at least during a closing process.

BACKGROUND OF DISCLOSURE

Closing devices for motor vehicle locks and in particular motor vehicle door lock closing aids have been used for some time, such as, for example, by the generic prior art according to DE 198 28 040 A1. In this case, an electric motor is provided which sets a control disk into rotations via a motor shaft and a screw. In this context, the rotary latch has a stop element which interacts with the control disk during a closing process. In this case, the transmission is defined by the motor shaft, the control disk and a pin located thereon. As a result, the term “transmission” is to be interpreted broadly within the scope of the present application, namely to the effect that the transmission typically ensures a transmission (or also a gear reduction) of rotational movements of the motor shaft of the electric motor in the broadest sense.

This can be realized and implemented by the combined effect of the screw in conjunction with the control disk and the pin. In addition, other embodiments of the transmission are also conceivable.

Thus, the further and likewise generic prior art according to DE 10 2019 107 845 A1 works with the help of an electric drive on a traction mechanism, which applies the required closing force to the rotary latch via a closing pawl. In order to realize and implement a pinch protection at this point, voltage and/or current pulses are generated during a closing process. As a function of this, a controller can switch off the electric drive. In addition, the drive can be reversed in this case.

As a result, an effective pinch protection can be realized and implemented. However, the design is complex. However, such pinch protection is practically indispensable in such closing devices in order to avoid injuries. This is substantially explained by the fact that during the closing process at the rotary latch, a locking bolt caught by the rotary latch is also acted upon in a closing sense. Since the locking bolt is typically connected to an associated motor vehicle door, a closing movement of the motor vehicle door in question directly corresponds to this. If during this process for example a finger of an operator enters a gap between the motor vehicle door and a motor vehicle body, pinching can occur.

In addition and substantially, it is necessary for such closing devices to provide an interruption of the closing actuation mechanism. An emergency unlocking corresponds to this. With the aid of such an emergency unlocking, for example, a user can unlock the associated vehicle lock and thus open it. This is particularly important for trunk lid locks with a closing aid. This is because if there is a person in the trunk or rear compartment of a vehicle, they cannot open the trunk lid in the example case without a functioning emergency unlocking.

At the same time, the required effectiveness is naturally to be provided unchanged, and the closing device should in particular be able to overcome counterforces occurring when closing by the door rubbers to be compressed between the associated motor vehicle door and the motor vehicle body.

SUMMARY OF DISCLOSURE

The invention is therefore based on the technical problem of further developing such a closing device in such a manner that, with unchanged effectiveness, a structurally simple and cost-effective embodiment is provided for emergency unlocking and therefore emergency opening.

In order to solve this technical problem, a generic closing device for a motor vehicle lock is characterized within the scope of the invention by the fact that a handle mounted on a lock housing is provided for mechanically interrupting the closing operation and thus for emergency unlocking, which handle impinges on a force flux element that can be selectively engaged and disengaged as a component of the transmission.

In contrast to the prior art, for example according to DE 10 2019 107 845 A1, according to the invention an emergency unlocking is realized purely mechanically and a complex sensor-based solution is expressly dispensed with. Here the handle ensures that the flow of force from the electric motor to the rotary latch via the transmission is interrupted very simply and purely mechanically without sensor querying. This is because the handle ensures that the force flux element is disengaged as a component of the transmission. The handle in question can typically be operated from the inside of the vehicle or from a trunk and is generally designed and configured as an emergency unlocking handle. Through the resulting emergency unlocking of the vehicle lock according to the invention, the vehicle lock can be opened subsequently or in one action. The same applies to a trunk lid advantageously equipped therewith. This is because the closing device according to the invention for a motor vehicle lock is generally and advantageously a closing device for a trunk lid lock, or the subject matter of the invention is such a trunk lid lock.

In contrast, the state of the handle not acted on corresponds to the force element being engaged in comparison with the transmission, consequently allowing the flow of force from the electric motor to the rotary latch via the transmission, and in this way first enabling the closing operation. In contrast to this, the disengaged state of the force flux element corresponds to a mechanical interruption in the course of an emergency unlocking, so that the associated motor vehicle door can be opened.

In this context, the design is also such that the handle is accessible when the door, or vehicle door belonging to the vehicle lock, is open, or also from inside the vehicle, so that a user can ensure the emergency unlocking by pressing the handle. Overall, the design and mechanical connection of the handle is realized in a particularly simple and advantageous manner because the handle is mounted on the lock housing.

At this point, a rotatable mounting of the handle on the relevant lock housing is usually used. This can be realized and implemented in a particularly simple manner in that both the lock housing and the handle are usually made of plastic. This results in favorable friction conditions, low costs, and minimized weight.

In addition, the design is usually and advantageously such that the handle not only impinges on the selectively engageable and disengageable force flux element as a component of the transmission, but is also set up to directly or indirectly impinge on on the pawl. The invention is based on the finding that the mechanical interruption of the force flux from the electric motor via the transmission to the rotary latch for the mechanical interruption of the closing process corresponds to an unimpeded opening of the relevant vehicle door if, in addition, the pawl is lifted off the rotary latch during the mechanical interruption process.

In other words, the supplementary or additional direct or indirect action on the pawl during the mechanical interruption of the closing process ensures that the pawl cannot inadvertently fall into the rotary latch and, for example, thereby hinder an opening process of the associated vehicle door following the mechanical interruption of the closing process. Instead, the vehicle door in question can be swung open or moved unhindered by an operator when necessary.

This can be attributed to the fact that the flow of force, interrupted during the mechanical interruption of the closing process, from the electric motor via the transmission to the rotary latch, or in the case of the emergency unlocking described, initially allows unhindered movement of the rotary latch. This also holds for the corresponding vehicle door, which usually engages with a locking bolt in the rotary latch and can therefore also be moved without resistance in this case. So that the movement of the locking bolt and thus of the rotary latch is not impeded here, the handle generally and additionally ensures that the pawl is lifted and consequently cannot fall into the rotary latch, or the latter is not hindered in its opening movement introduced by an operator. These are the main advantages.

From a design point of view, it has proven itself if the handle is designed with multiple arms. The handle usually has at least one element arm and one pawl arm. The force flux element is generally impinged on by means of the element arm. In contrast, in this context, the pawl arm ensures the additional impinging of the pawl. The handle usually also has an impinging arm. The handle can be acted upon by the operator in question via the impinging arm and can, for example, be rotationally pivoted relative to the lock housing functioning as a bearing.

In this context, it has further proven useful if the handle is designed In one piece. This can be realized in a particularly simple manner in that the handle is advantageously a plastic injection-molded part. However, it is also possible to design the handle in multipart fashion. In this case, the procedure is usually such that the impinging arm and the pawl arm represent a component of the handle which, during the installation of the handle and its mounting on the lock housing, is generally rotationally fixedly coupled to the further second component in the form of the element arm. For this purpose, corresponding tooth and counter-tooth formations can be coupled to one another in a rotationally fixed manner.

The handle is usually designed in such a way that it is used to apply a linear force to the force flux element. The linear impinging on the force flux element ensures in a simple way that the force flux element interrupts the flow of force within the transmission. For this purpose, the force flux element is typically a gear element, which normally assumes its engaged position as part of the transmission when the handle is not loaded, and is therefore integrated into the force flux of the transmission. The disengaged position of the force flux element or gear element, on the other hand, corresponds to the gear element in question being disengaged from its neighboring gears, so that the flow of force inside the transmission is thereby interrupted.

In principle, however, the force flux element can additionally or alternatively also be a coupling element. The coupling element can here be transferred from its engaged state into the disengaged state, comparable to the gear element. For this purpose, the coupling element is generally acted on linearly by the handle. The engaged position of the coupling element corresponds to the fact that, for example, a connection between gears of the transmission is established with the aid of the coupling element. If, on the other hand, the coupling element assumes its disengaged position, the relevant mechanical connection is interrupted.

As a rule, the force flux element or gear element is pretensioned in its engaged position with the aid of a spring. That is, the spring ensures that the force flux element assumes its engaged position. The force of the spring must be overcome with the aid of the handle in order to move the force flux element into its disengaged position.

The spring can, for example, be a spiral spring which surrounds a pin provided on the force flux element. Alternatively or additionally, the component can however also be designed as a leaf spring. In this context, according to particularly preferred embodiments it has proven successful if the spring impinges on both the force flux element and the handle. In this case, the (single) spring ensures that the force flux element is pretensioned in the direction of its engaged position. At the same time, the (single) spring ensures that the handle assumes its unimpinged base position.

Consequently, if the handle is acted on for mechanical interruption of the closing process or for emergency unlocking, the handle must work against the force of the (single) spring in order on the one hand to displace the handle relative to the lock housing and to disengage the force flux element on the other and, in addition, generally to lift the pawl relative to the rotary latch.

As a result, a closing device is provided which enables an emergency unlocking of the associated motor vehicle lock and, in principle, also an effective interruption of the closing process, but for this purpose provides, in a striking design, a simple and cost-effective mechanical solution. For this purpose, the force flux element which can be selectively engaged and disengaged is provided as a component of the transmission. The same holds for the handle mounted on the lock housing. The handle can thereby be easily adapted to differently designed lock housings and to specific requirements. Additional devices, such as sensors, motors, etc. are expressly dispensable. Instead, a simple mechanical solution is provided. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
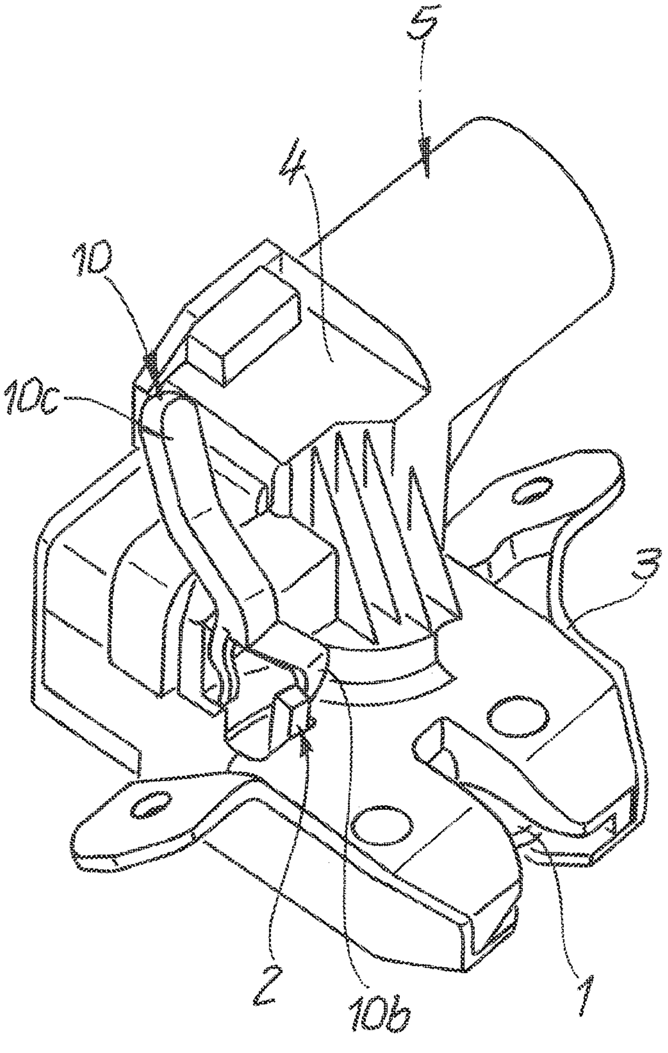
FIG. 1 shows an overview of the latching device according to the invention.

In the figures, a closing device is shown for a motor vehicle lock, or motor vehicle door lock, that is only partially shown. This is advantageously a trunk lid lock. Accordingly, a motor vehicle door lock closing aid is described in more detail and is shown in the figure. For this purpose, the basic design of the vehicle door lock has a locking mechanism 1, 2 consisting essentially of a rotary latch 1 and a pawl 2, which can be seen only in rudimentary form in FIG. 1. The locking mechanism 1, 2 is rotatably mounted in a metal lock case 3. A lock housing 4 made of plastic provides the housing of the illustrated motor vehicle lock, or motor vehicle door lock.

The closing device has, in detail, an electric motor 5 and a transmission 6, 7, 8, 9 following the electric motor 5. For this purpose, the transmission 6, 7, 8, 9 consists of a first transmission element 6, which meshes with the output shaft of the electric motor 5, and a second transmission element 7. The two transmission elements 6, 7 can be gears which are arranged offset to one another according to the exemplary embodiment. Here a force flux element 8 is of particular importance, which is a gear element in the context of the illustration according to FIGS. 1 to 3. In contrast, the force flux element 8 is designed as a coupling element in the variant according to FIG. 4.

The force flux element 8 is a component of the transmission 6, 7, 8, 9 and couples the first and second transmission elements 6, 7 with an output-side transmission element 9, which, according to the exemplary embodiment, is a drive pawl operating directly or indirectly on the rotary latch 1. That is, rotary movements of the output-side gear element side or the drive pawl 9 ensure that starting from for example a pre-latching position the rotary latch 1 is pivoted into the main latching position, and consequently a motor vehicle door (not shown) is closed. For this purpose, the gear mechanism 6, 7, 8, 9 operates on the rotary latch 1 at least during such a closing process. In addition, here a continuous flow of force is observed from the electric motor 5 via the transmission 6, 7, 8, 9 to the rotary latch 1. In principle, however, the closing device or the transmission 6, 7, 8, 9 could also operate on a locking bolt (not shown).

In fact, the motor vehicle door in question, which is not explicitly shown, is equipped with the closing bolt fixed to the door, which is caught by the rotary latch 1 (in the pre-latching position) and follows the described closing movement of the rotary latch 1 from the pre-latching position to the main latching position. The corresponding motor vehicle door is thereby closed and a gap between the motor vehicle door and a motor vehicle body is closed. Should it be necessary and the relevant motor vehicle lock and in particular the trunk lid lock have to be unlocked in an emergency and thus the associated trunk lid opened, the invention provides for an emergency unlocking described below.

Figure 2:
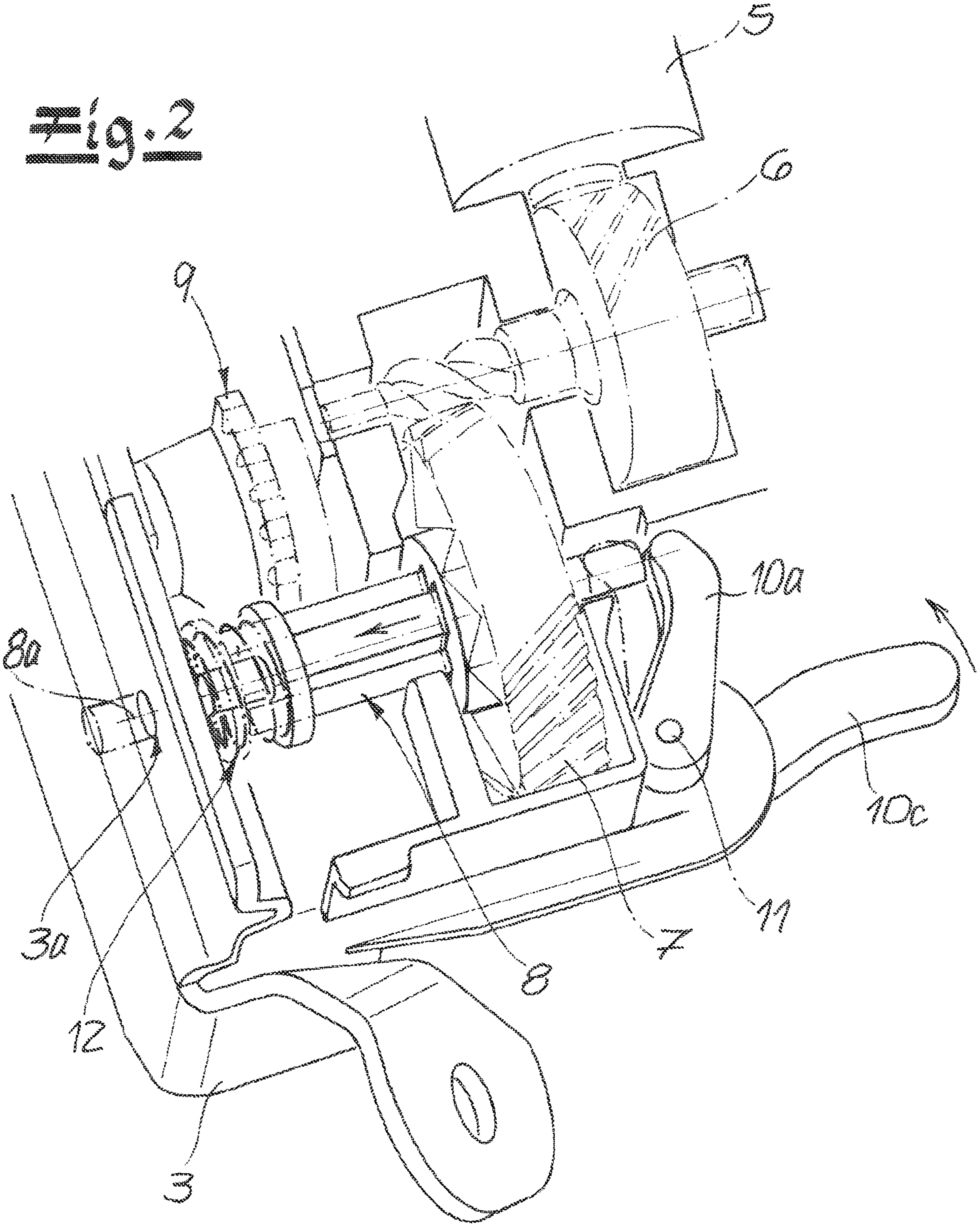
FIGS. 2 and 3 show the closing device according to FIG. 1 with opened housing, in two different embodiments.

According to the invention, a handle 10 mounted on the lock housing 4 is provided for mechanically interrupting the closing process. The handle 10 acts on the force flux element 8, which can be selectively engaged and disengaged and is described above, as a component of the transmission 6, 7, 8, 9. In fact, the handle 10 generally operates linearly on the force flux element 8 and ensures that, in the disengaged state shown by a dash-dotted line, a mechanical connection between the force flux element 8 or the upstream transmission elements 6, 7 on the one hand and the drive pawl 9 on the other hand is interrupted. For this purpose, the handle 10 is actuated counterclockwise about its axle 11 relative to the lock housing 4, as shown in FIG. 2. In fact, a bolt or pin is provided in or on the lock housing 4, which bolt or pin defines the axle 11 for the rotatable mounting of the handle 10 on the lock housing 4. The bolt or pin can here represent a component of the lock housing 4, designed as a plastic injection-molded part.

In this way, the force flux element 8 is transferred from its typically assumed engaged state, shown as a solid line, to the disengaged state, shown as a dotted line. In the disengaged state of the force flux element 8, the flow of force from the electric motor 5 via the transmission 6, 7, 8, 9 to the rotary latch 1 is interrupted. As a result, the rotary latch 1 and with it the locking bolt caught by the rotary latch 1, and as a result the vehicle door, can be moved back and forth and thereby unlocked and opened in an emergency.

To ensure that the pawl 2 does not inadvertently engage with the rotary latch 1 during this process, in the exemplary embodiment the handle 10 not only ensures that the force flux element 8 is disengaged as described. Rather, the handle 10 is additionally set up to indirectly or directly impinge on the pawl 2. Here the pawl 2 is lifted off from the rotary latch 1.

For this reason, the handle 10 according to the exemplary embodiment is equipped with multiple arms, with at least one element arm 10*a* and one pawl arm 10*b*. An impinging arm 10*c* can also be seen. An operator's hand usually grips the impinging arm 10*c* and ensures that the handle 10 performs the counter-clockwise movement shown in FIG. 2 about its axle 11 with respect to the lock housing 4. On the one hand, the force flux element 8 is thereby disengaged and, on the other hand, the pawl 2 is lifted off from the rotary latch 1. As a result, in this described mechanical interruption of the closing process, the rotary latch 1 and with it the locking bolt which is caught by it, and as a result the associated motor vehicle door, can then be moved back and forth without force, and in particular opened.

Figure 3:
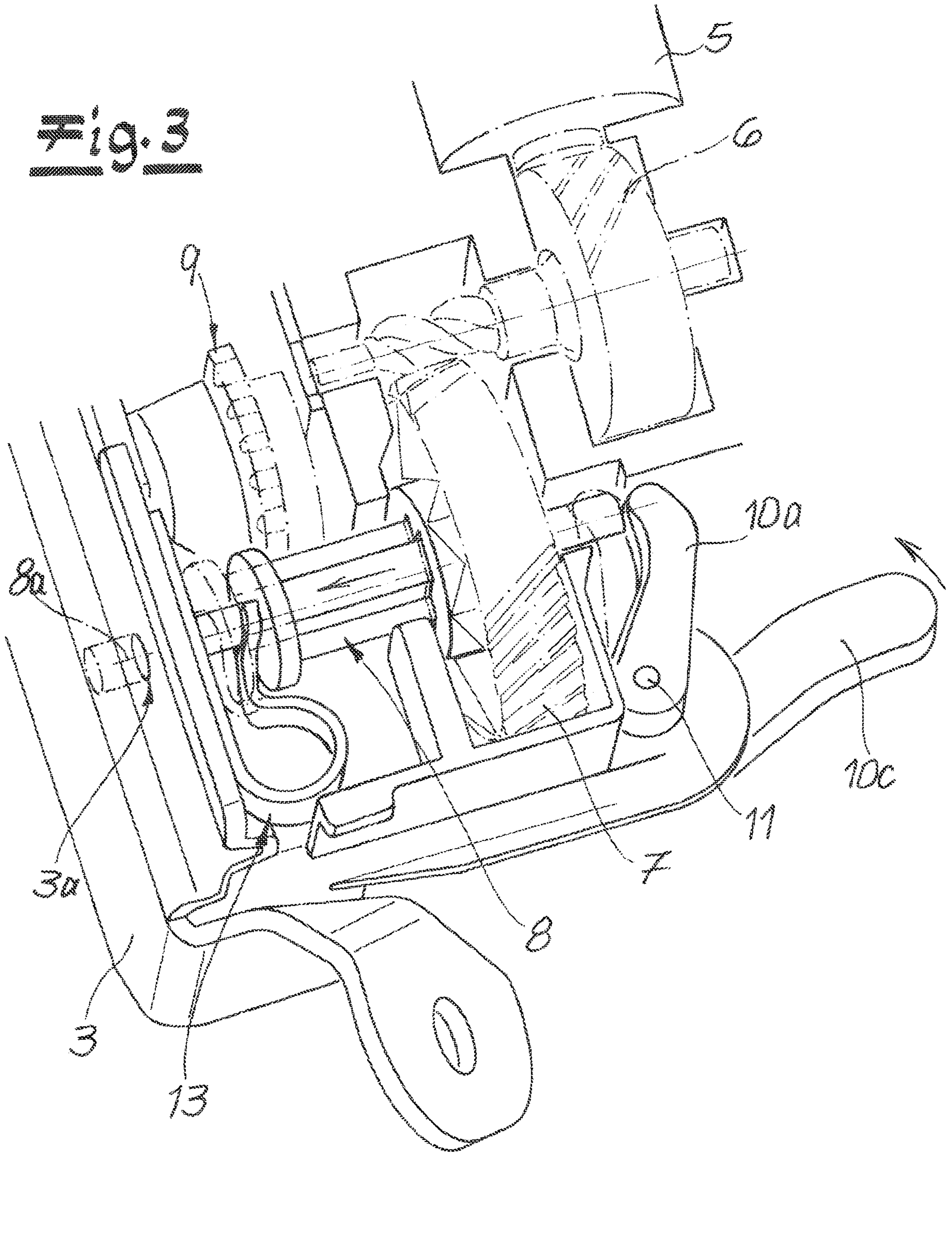
Figure 4:
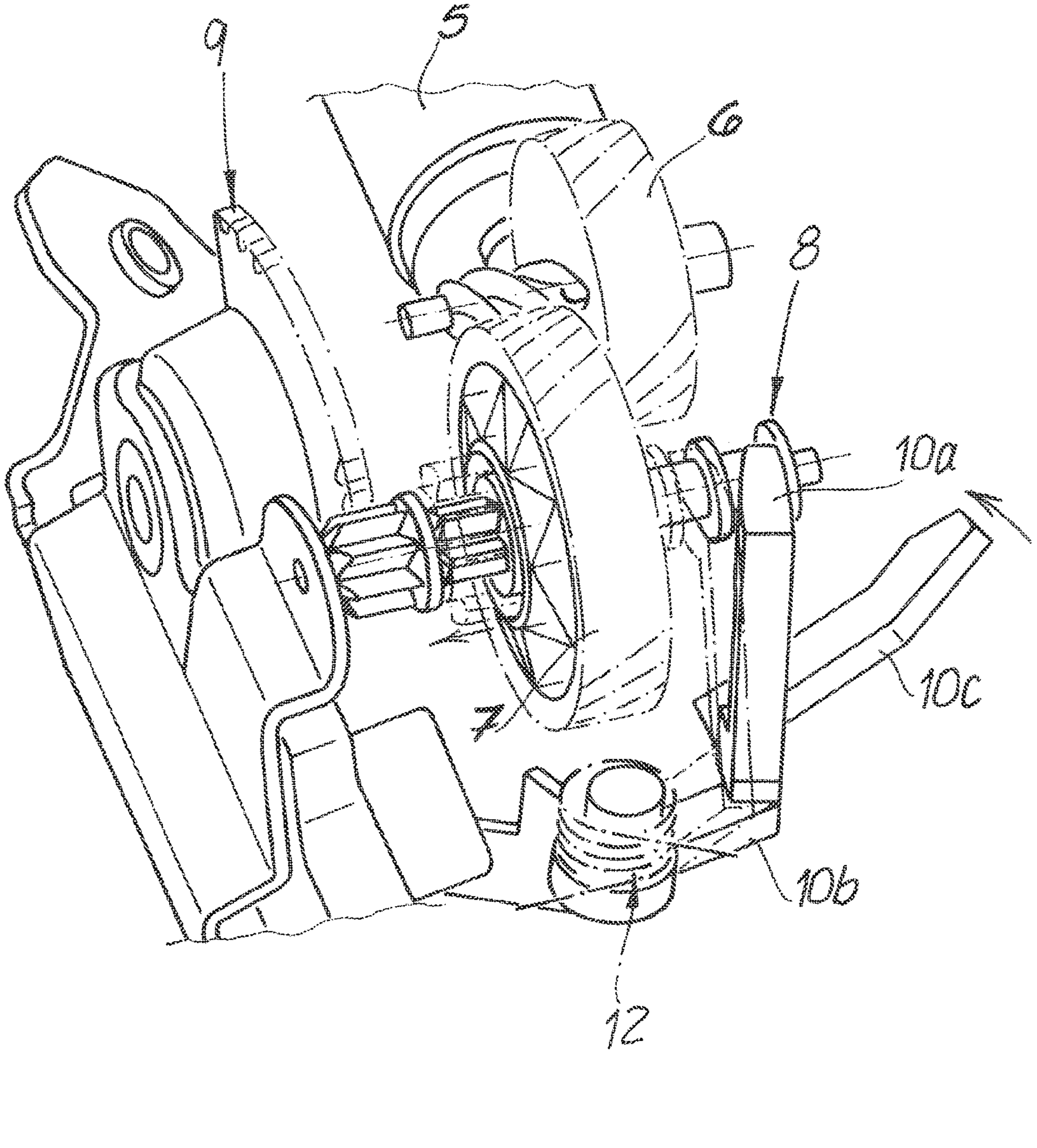
FIG. 4 shows the closing device with opened housing, again in a modified embodiment.

The handle 10 can be designed in one piece overall, as shown in FIG. 4. In principle, a multipart design corresponding to the exemplary embodiment according to FIGS. 1 to 3 is also conceivable. In this case, a part of the handle is formed jointly by the pawl arm 10*b* and the impinging arm 10*c*, while the other part of the multipart, in this case two-part, handle 10 is defined by the element arm 10*a*. Both parts of the multipart or two-part handle 10 can here be rotationally fixedly coupled to one another during the assembly on the lock housing 4. For this purpose, the pin connected to one component of the handle 10 engages in rotatably fixed fashion with the other component of the handle 10. At the same time, an opening in the lock housing 4 is penetrated to define the shaft 11.

It can be seen from FIGS. 1 to 3 and 4 that the force flux element 8 is pretensioned in its engaged position, shown in solid lines, by a spring 12, 13. In the exemplary embodiment according to FIG. 2, the spring 12, 13 is a spiral spring 12 which surrounds a guide pin 8*a* of the force flux element 8. In fact, the design is such that the force flux element 8 is guided in its linear direction via the guide pin 8*a* and, consequently, in the disengaged state can pass through a corresponding opening 3*a* provided in the lock casing 3.

In contrast, the spring 13 according to the variant of FIG. 3 is a leaf spring 13. In both cases, the spring 12, 13 in each case ensures that the force flux element 8 is pretensioned in the direction of its engaged state shown by solid lines. That is, in order to disengage the force flux element 8 into its position shown in dotted lines, the force of the relevant spring 12, 13 must be overcome with the aid of the handle 10.

In the variant according to FIG. 4, only a single spring 12 in the form of a spiral spring 12 is realized. In this case, the single spring or spiral spring 12 ensures that on the one hand the force flux element 8 is pretensioned in the direction of its engaged position and on the other hand the handle 10 is pretensioned in the direction of its undeflected base position. This provides and realizes a particularly compact and cost-effective design.

In the exemplary embodiment shown in FIG. 4, it is seen that the handle 10 applies a linear force to the force flux element 8, which is designed here as a coupling element, in order to be able to mechanically interrupt the closing process. In FIG. 4, the engaged state is again shown as a solid line and the disengaged state as a dotted line. In this context, the coupling element or force flux element 8 ensures that the second transmission element 7 and the drive pawl 9 are mechanically coupled to each other in its engaged state. The engaged state shown by solid lines belongs to this. As a result of this, the electric motor 5 can operate on the rotary latch 1 via the transmission 6, 7, 8, 9 and impinge on it in a closing sense, as described at the outset.

For mechanical interruption of the illustrated closing aid and thus for emergency unlocking, the handle 10 on the impinging arm 10*c* is actuated by an operator (counterclockwise) so that the force flux element 8, or coupling element, is disengaged as a result. Due to this, the flow of force from the electric motor 5 via the transmission 6, 7, 8, 9 to the rotary latch 1 is interrupted and the rotary latch 1 can in turn be pivoted together with the locking bolt caught by it. At the same time, during this process the pawl arm 10*b* of the handle 10 ensures that the pawl 2 cannot latch with the rotary latch 1 during this process, but rather is lifted off the rotary latch 1.

LIST OF REFERENCE NUMBERS

1 Rotary latch
2 Pawl
1, 2 Locking mechanism
3 Lock case
4 Lock housing
5 Electric motor
6, 7, 8, 9 Transmission
6, 7 Transmission element
8 Force flux element
8*a* Guide pin
9 Output-side transmission element
10 Handle
11 Axle
10*a* Element arm
10*b* Pawl arm
10*c* Impinging arm
12, 13 Spring
12 Spiral spring
13 Leaf spring

The invention claimed is:

1. A closing device for a motor vehicle lock comprising:

a locking mechanism including a rotary latch and a pawl, an electric motor, a transmission following the electric motor and including a force flux element, this is selectively engaged and disengaged, wherein the transmission operates at least during a closing operation on the rotary latch, a lock housing, and a handle which is mounted at the lock housing for mechanically interrupting the closing operation, the handle impinging the force flux element to disengage the force flux element to mechanically interrupt the closing operation, wherein the handle includes an impinging arm rotatably mounted on an exterior of the lock housing and is operable by an operator to disengage the force flux element to mechanically interrupt the closing operation, wherein the handle further includes an element arm that impinges the force flux element and a pawl arm that directly impinges the pawl during the mechanical interruption of the closing operation, and wherein the handle has a one-piece design.

2. The closing device according to claim 1, wherein the handle linearly impinges on the force flux element.

3. The closing device according to claim 1, further comprising a spring, wherein the force flux element is pretensioned in an engaged position by the spring.

4. The closing device according to claim 3, wherein the spring impinges on both the force flux element and the handle.

5. The closing device according to claim 3, wherein the spring is a spiral spring or a leaf spring.

6. The closing device according to claim 1, wherein the force flux element is a toothed wheel element and/or a coupling element positioned between gears of the transmission.

7. A motor vehicle lock comprising a closing bolt and a closing device according to claim 1.

8. The closing device according to claim 1, wherein the handle and the locking housing both are made of plastic.

9. The closing device according to claim 1, wherein:

the transmission includes a first transmission element that meshes with an output shaft of the motor, a second transmission element that engages with the first transmission element, and an output side transmission element that acts on the rotary latch, and in an engaged position the force flux element couples the first and second transmission elements with the output side transmission element, and in a disengaged position the force flux element decouples the first and second transmission elements from the output side transmission element.

10. The closing device according to claim 9, wherein the first transmission element, the second transmission element, and the output side transmission element are gears.

11. The closing device according to claim 1, wherein the handle includes an axle extending through the housing connecting the impinging arm and the element arm.

* * * * *